(12) United States Patent
Phillips

(10) Patent No.: US 10,116,503 B2
(45) Date of Patent: *Oct. 30, 2018

(54) AD HOC WIRELESS MESH NETWORK

(71) Applicant: AmpliSine Labs, LLC, Lubbock, TX (US)

(72) Inventor: Aaron Phillips, Lubbock, TX (US)

(73) Assignee: AmpliSine Labs, LLC, Lubbock, TX (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/183,318

(22) Filed: Jun. 15, 2016

(65) Prior Publication Data

US 2016/0294622 A1 Oct. 6, 2016

Related U.S. Application Data

(63) Continuation of application No. 14/735,701, filed on Jun. 10, 2015, now Pat. No. 9,391,839.

(Continued)

(51) Int. Cl.
| | | |
|---|---|---|
| *H04L 12/24* | (2006.01) | |
| *H04L 12/761* | (2013.01) | |
| *H04W 76/04* | (2009.01) | |
| *H04W 76/20* | (2018.01) | |
| *H04L 12/26* | (2006.01) | |
| *H04W 84/18* | (2009.01) | |

(52) U.S. Cl.
CPC ......... *H04L 41/0816* (2013.01); *H04L 43/16* (2013.01); *H04L 45/16* (2013.01); *H04W 76/04* (2013.01); *H04W 76/20* (2018.02); *H04W 84/18* (2013.01)

(58) Field of Classification Search
None
See application file for complete search history.

(56) References Cited

U.S. PATENT DOCUMENTS 8,427,942 B2 \* 4/2013 Kim ...................... H04W 48/16
370/229
8,971,231 B2 \* 3/2015 Hua ........................ H04L 45/26
370/315

(Continued)

*Primary Examiner* — Hassan Kizou
*Assistant Examiner* — Deepa Belur
(74) *Attorney, Agent, or Firm* — Pillsbury Winthrop Shaw Pittman LLP

(57) ABSTRACT

Provided is process of operating a wireless device configured to act as a node in an ad hoc multi-hop mobile network, the process including: snooping, with a wireless device, a packet transmitted from a sending node to a receiving node in a multi-hop wireless connection, the sending node and the receiving node being in a different location; extracting from the snooped packet an identifier of the sending node and an identifier of the receiving node; determining based on the identifier of the sending node, the identifier of the receiving node, and a record in memory of the wireless device that the wireless device is part of a multi-hop wireless connection including the sending node and the receiving node; determining that a signal strength of a signal conveying the snooped packet exceeds a threshold; and transmitting a kill packet to the sending node and the receiving node that reconfigures the multi-hop wireless connection to bypass the receiving node.

32 Claims, 6 Drawing Sheets

Related U.S. Application Data

(60) Provisional application No. 62/010,729, filed on Jun. 11, 2014.

(56) References Cited

U.S. PATENT DOCUMENTS

| | | | | |
|---|---|---|---|---|
| 2006/0146733 A1* | 7/2006 | Alicherry | H04L 45/00 | 370/255 |
| 2007/0110053 A1* | 5/2007 | Soni | H04L 63/0263 | 370/389 |
| 2008/0002599 A1* | 1/2008 | Yau | H04L 45/36 | 370/310 |
| 2010/0008226 A1* | 1/2010 | Kang | H04W 4/00 | 370/235 |
| 2011/0098914 A1* | 4/2011 | Milbert | G01C 21/20 | 701/532 |
| 2011/0306375 A1* | 12/2011 | Chandra | H04W 24/00 | 455/509 |
| 2012/0044864 A1* | 2/2012 | Zhang | H04W 40/246 | 370/328 |
| 2012/0163206 A1* | 6/2012 | Leung | G01S 5/0009 | 370/252 |
| 2015/0109994 A1* | 4/2015 | Wilkinson | H04W 40/246 | 370/328 |
| 2015/0172991 A1* | 6/2015 | Petersen | H04W 40/12 | 370/252 |
| 2016/0234167 A1* | 8/2016 | Engel | H04L 63/1408 | |
| 2017/0055279 A1* | 2/2017 | Janis | H04B 17/318 | |

* cited by examiner

AD HOC WIRELESS MESH NETWORK

CROSS-REFERENCE TO RELATED APPLICATIONS

The present application is a continuation of and claims priority from U.S. Non-provisional patent application Ser. No. 14/735,701, filed 10 Jun. 2015, which claims the benefit of U.S. Provisional Patent Application 62/010,729, filed 11 Jun. 2014, titled "AD HOC WIRELESS MESH NETWORK FOR OIL AND GAS EQUIPMENT," the entire contents of which are hereby incorporated by reference for all purposes.

BACKGROUND

1. Field

The present invention relates generally to techniques useful in networking and, in particular, in applications of wireless mesh networking.

2. Description of the Related Art

Generally, oil and gas equipment need to exchange data with remote entities. Sensors on the equipment gather data that remote entities, like operating companies, may wish to monitor, and remote employees of those companies often desire to send data to the equipment to effect controls thereon. Further, in rural areas where such equipment is often found, there is relatively incomplete Internet access, both for industrial users and consumers in the area, who often would like Internet access for residential use or for use while traveling through rural areas.

Various existing ad hoc wireless mesh networks are not adequate for many use cases related to oil and gas equipment operating in rural areas. Often multi-hop routes through such networks will degrade, e.g., due to nodes moving, changes in weather, or transient interfering transmitters. In many systems, upon degradation in an existing route, the entire route is discarded, causing the network to undertake establishment of a new, replacement route. Regenerating the route from scratch can slow operation of the network and reduce the ratio of overhead to usable bandwidth in an unfavorable fashion, particularly for routes with relatively high hop counts, as often occur in rural deployments.

SUMMARY

The following is a non-exhaustive listing of some aspects of the present techniques. These and other aspects are described in the following disclosure.

Some aspects include a process of operating a wireless device configured to act as a node in an ad hoc multi-hop mobile network, the method comprising: snooping, with a wireless device, a packet transmitted from a sending node to a receiving node in a multi-hop wireless connection, the sending node and the receiving node being in a different location from the wireless device; extracting from the snooped packet an identifier of the sending node and an identifier of the receiving node; determining based on the identifier of the sending node, the identifier of the receiving node, and a record in memory of the wireless device that the wireless device is part of a multi-hop wireless connection including the sending node and the receiving node; determining that a signal strength of a signal conveying the snooped packet exceeds a threshold; and transmitting a kill packet to the sending node and the receiving node that reconfigures the multi-hop wireless connection to bypass the receiving node.

Some aspects include a tangible, non-transitory, machine-readable medium storing instructions that when executed by a data processing apparatus cause the data processing apparatus to perform operations including the above-mentioned process.

Some aspects include a wireless interface, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
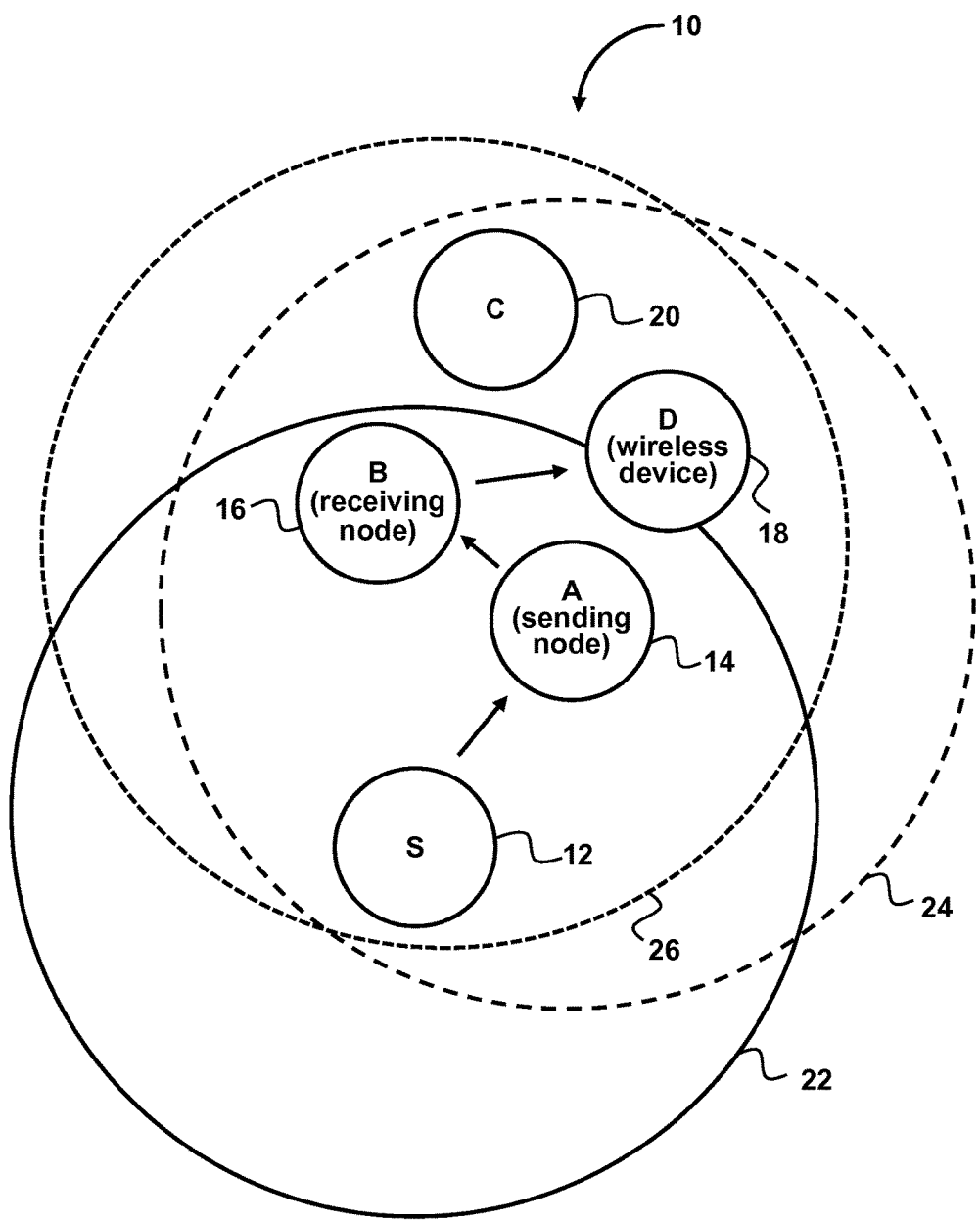
FIGS. 1 and 2 illustrate before and after states of an ad hoc mesh network in which a route is dynamically adjusted.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of wireless networking. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The present patent describes techniques useful in wireless mesh networking, and in particular, in applications of wireless mesh network in the oil and gas industry. To this end, some embodiments use as nodes the site master controllers described in U.S. Pat. No. 8,649,909, issuing from U.S. patent application Ser. No. 13/708,557, filed 7 Dec. 2012, the entire contents of both of which are hereby incorporated by reference for all purposes. Further, embodiments may be implemented as part of network coding and error correction capable nodes, such as those described in U.S. patent application Ser. No. 14/299,723, filed 9 Jun. 2014, the entire contents of which are hereby incorporated by reference, including the material incorporated by reference therein, which includes U.S. Pat. No. 8,649,909; Analysis of General Network Coding Conditions and Design of a Free-Ride-Oriented Routing Metric, by Bin Guo et al., published in IEEE Transactions on Vehicular Technology, Vol. 60, No. 4, on May 2011; and Network coding theory: An introduction, by Raymond W. Yeung, Front. Electr. Electron. Eng. China 2010, 5(3): 363-390.

Applications of the present techniques are not limited to rural areas or oil and gas fields. In some cases, a network formed with the nodes described herein may be used to provide consumer Internet access, in addition to, or as an alternative to, conveying data obtained from (or directed to) oil and gas related facilities. For example, some nodes may have an Ethernet port and network interface by which a consumer may connect a local area network or personal computer to use the node as a modem for obtaining Internet access in rural areas or in urban areas, such as those with crowded spectrum and low broadcast strengths leading to higher hop counts, e.g., three or more hops. Further, embodiments are consistent with single hop and double hop use cases. In some cases, users may be billed, e.g., monthly, for a subscription providing access, or users may be billed based on usage, e.g., per Gb, assessed monthly.

Some embodiments may transmit in the broadcast television whitespace spectrum recently made available by the United States Federal Communications Commission. Thus, available frequencies and transmission strengths may vary by geographic location (which may be changing for mobile nodes) and by time of day (e.g., as other transmitters move into and out of broadcast range of a given node). In some embodiments, nodes may sense their current wireless environment with a spectrum sensing approach to determine available channels, e.g., unused TV spectrum. Additionally, or alternatively, nodes of some embodiments may identify unused spectrum, e.g., vacant channels, based on a geolocation sensor on each node (e.g., a Global Positioning System, or other satellite navigation system, sensor operative to sense geographic location, or for some fixed nodes, to reduce cost, a value programmed in memory indicative of geolocation) and the capability to access through the Internet a remote database that identifies incumbent licensed operations entitled to interference protection. Embodiment nodes may sense their geolocations and send a query, in some cases via the mesh networks described herein, to such a database for available spectrum and, in response, select spectrum for transmission by a given node. (Protected incumbent operations may include, for example, TV stations, broadcast auxiliary point-to-point facilities, low power auxiliary service operations (wireless microphones), and the like.) Such a remote database may also include records reflecting protected locations and channels of certain radio frequency services that are not recorded in FCC databases, such as the locations of cable headends and low power TV receive sites that are outside the protected contours of the TV stations whose signals they receive. The database accessed by an embodiment node may respond with a list of TV channels that are vacant and can be used at the device's location.

Whitespace spectrum may be updated (e.g., re-selected) periodically (e.g., every minute, hour, or day) or in response to some event (e.g., receiving a request to transmit data, detecting the existence of non-native transmission the current frequency, or determining that a signal-to-interference-plus-noise ratio (SINR), packet loss, or congestion has crossed a threshold). Once a node determines to update the frequency or (i.e., and/or) power at which it transmits, a node may query a remote whitespace database as described above via the Internet with the node's current geographic location and select among the responsive unclaimed spectrum. Some embodiment nodes may select a frequency from among the responsive spectrum based on a balance (e.g., an aggregate value, such as a weighted score) between data rate and distance. Generally, data rate increases as transmit frequency increases, while transmit distance at a given power decreases as frequency increases. Some embodiments may combine OFDMA with CDMA to use wider or non-continuous bands.

Some embodiment nodes may select among available spectrum by iterating down through available frequencies, e.g., by starting at a high frequency, and then decreasing by a decrement until a signal (e.g., an ACK, or acknowledgement signal) is received from another node (or from two or more nodes or other thresholded count or other amount) indicating that the transmission was successful. Such an arrangement is expected to yield relatively high data rates while accommodating the geographic arrangement in which a node finds itself relative to other nodes. In some cases, at a given frequency, a node may retry transmission before determining to iterate to a lower frequency in the absence of an ACK signal, as transient noise may lead to unnecessarily low frequency selections. For instance, some embodiment nodes may apply a Long Retry Limit (LRL) before decrementing, where the LRL is a number of retransmission attempts for frames longer than a request to send threshold, or a value where frames larger than the threshold are preceded by a request to send/clear to send exchange. In other examples, some embodiment nodes may apply a Short Retry Limit (SRL) before decrementing, where the SRL is a number of retransmission attempts for frames shorter than a request to send threshold. In other examples, a retry limit may be dynamically selected based on movement of nodes in a network, e.g., a retry limit may be increased in response to the relative speed of a node (for instance, as sensed by a GPS sensor of the node) increasing. In such an implementation, if a node is moving faster, that node (in some embodiments) is quicker to infer that it is having a transmission problem and adjust to a lower frequency, trading data rate for transmission range.

Transmission power may be selected by each node with a variety of techniques. In some cases, after selecting a transmission frequency, embodiments may determine transmission power. Generally, nodes waste spectrum and power by transmitting more powerfully than needed, so some embodiments seek to reduce transmit power. In some cases, when replying to a route request message, a node senses its current geolocation and velocity vector by polling a GPS sensor of the node and transmits the same along with a reply to the route request message. A receiving node may then, in response to the reply, calculate a transmit power based on a distance from that node (as sensed by polling a GPS sensor of the receiving node) to the replying node and, in some cases based on magnitude of a vector formed by subtracting the velocity vectors of the two nodes. The resulting transmit power and frequency may be stored in memory of the respective node and used for subsequent transmissions until updated.

In some cases, the nodes serve the role of a gateway node and includes an additional network adapter, such as a cellular interface having a cellular radio or an Ethernet network adapter for interfacing with a wired network. In these examples, the gateway node may use the additional network adapter to exchange data with the Internet on behalf of other nodes in the network, and the gateway node itself, depending upon the source or destination of the data to be conveyed.

Some embodiments may communicate in white space TV bands with the following functionality: speeds of 500 kbps and up; range of 2-20 miles; ad hoc networking; and Ethernet/IP based interface to outside world. To this end, some embodiment nodes may include a programmable radio operating in the 400 MHz-1.8 GHz bands. In some cases, a cognitive radio configured to operate within FCC limits in the whitespace spectrum is used. Some networks may include Ethernet/IP based interfaces to the Internet and a mineral-extraction related industrial site (e.g., an oil-and-gas related equipment in the field). Some embodiments may include directional antennas for larger range transmission, e.g., between geographically fixed nodes.

Some nodes may serve as gateway nodes, which may have one or more of the following features: some gateway nodes may be capable of connecting multiple nodes to the Internet through multi-hop communication; some gateway nodes may supply node-to-node communication via a protocol such as AODV or one or more of the forms of network coding described herein; some gateway nodes may be capable of supporting data transmission of up to 20 local sensing nodes at one site and up to 10 remote sites. In some embodiments, gateway nodes include an additional radio for cellular communication. Generally, non-gateway nodes convey data between leaf (or source) nodes of the network (e.g., industrial equipment sensors or controllers or user modems) and a gateway node with which a mesh network is formed.

In some cases, gateway nodes (or other, non-gateway nodes) include an antenna placed at 8-10 ft or higher above ground level for longer range. In some cases, nodes have a fixed (e.g., non-battery) electric power source, such as is often found at fixed salt-water injection sites or oil/gas wells. In some cases, nodes have universal serial bus (USB) or Ethernet connectivity to provide an interface for control by personal computer (PC) or Internet access if a wired or wireless (e.g., cellular) connection is available. In some embodiments, nodes may be able to transmit data on a single link at distances from 100 yards to few miles. The communication range, in some cases, extends to 25 miles. Nodes, in some embodiments, support transmission rates for a telemetry applications, e.g., pressure levels, on/off status, monitoring operations including arrival of trucks and loads, billing messages, and other data often generated at oil-and-gas related sites, like saltwater disposal facilities or drilling sites. In some cases, nodes may support transfers of messages at 100 bytes per second rates or higher to meet industrial equipment bandwidth needs.

FIG. 1 shows an example of an ad hoc multi-hop multi-path wireless mesh network that may be constructed with examples of the wireless nodes (also referred to as "nodes," which may also include wired connections in addition to wireless connections) described herein. A relatively small number of gateway nodes and non-gateway nodes (e.g., terminal nodes and intermediate nodes) are illustrated by way of example, but it should be understood that substantially more nodes may be used in commercial embodiments. Further, the illustrated embodiments include three hops between the terminal node and the gateway node, but in other embodiments, signals may pass through fewer or more non-gateway nodes before being relayed to a gateway node. In some cases, the nodes may be distributed throughout a rural oil bearing region, and some or all of the nodes may be each associated with a respective piece of oil or gas related equipment, such as oil wells, pumping stations, reinjection facilities, salt water disposal facilities, and the like. In some cases, each node may draw power from a power supply associated with such equipment and convey data from and commands to such equipment from remote operators. In other cases, some or a substantial portion or all of the nodes may be mobile nodes, for example, associated with trucks and other equipment driving through oilfields to service equipment. Of course, applications are not limited to the oilfield, and other industries are expected to benefit from the present techniques.

In some cases, nodes associated with fixed assets, like oil and gas equipment, having a reliable and steady power supply, such as a generator or grid power, may broadcast such attributes during route selection such that routes passing through those nodes may be up weighted when ranking candidate routes to favor routes having less transient stable nodes.

In the illustrated figure, Internet access may be provided via a cellular tower that communicates with a cellular network interface on the gateway node, but it should be understood that other forms of Internet access may communicate with the gateway nodes, including wired Internet connections.

Examples of nodes by which the present techniques may be implemented are described in U.S. patent application Ser. No. 14/299,723, filed 9 Jun. 2014, titled "MULTI-PATH WIRELESS MESH NETWORKS IN OIL AND GAS FIELDS," which as noted above, is incorporated by reference it its entirety. In some embodiments, the nodes may be wireless interfaces of computing devices, like those described below with reference to FIG. 6, or wireless network interfaces of the site master controllers described in U.S. Pat. No. 8,649,909, which, as noted above, is also incorporated by reference for all purposes, connecting the site master controllers to the Internet. In some cases, embodiments of these nodes may store in tangible, machine readable memory, instructions that cause the nodes to execute processes described below with reference to FIGS. 1-5. In some embodiments, these processes may dynamically adjust a route through an ad hoc multi-hop wireless mesh network without re-creating the entire route in all cases in which a route is adjusted.

FIG. 1 shows an example of an ad hoc wireless multi-hop mesh network 10. FIG. 1 shows a "before" configuration of the network 10, which is referred to below to explain a process that transitions the network 10 to an "after" configuration shown in FIG. 2. The techniques by which the network 10 transitions from FIG. 1 to FIG. 2 may dynamically reconfigure a route to accommodate changes in the relative position of components of the network or changes in the wireless environment. In some cases (i.e., in some embodiments or use cases), as explained below, the reconfiguration may be performed without recalculating an entire multi-hop route, which may facilitate deployments in rural environments, or in urban environments with relatively crowded spectrum, where lower broadcast strength may be used and higher hop counts may be relevant, making re-calculation of an entire route relatively expensive.

In some cases, the ad hoc wireless network may be created without a central authority instructing which component to communicate with which other component, and the components may collectively select routes, for example with peer-to-peer algorithms in other techniques, like those described in U.S. patent application Ser. No. 14/299,723. In, an example route through the network 10 is illustrated by a series of errors between the components, or nodes of the network 10.

In the example network 10, five nodes are illustrated, labeled 12, 14, 16, 18, and 20. Each node may include, or be, a wireless interface, like that described in U.S. patent application Ser. No. 14/299,723, which in some cases may be coupled to a computing device, like that described below with reference to FIG. 6, and in some cases, to a site master controller, like that described in U.S. Pat. No. 8,649,909. In some embodiments, the node may serve as a wireless router providing a wireless local area network (e.g., a WiFi™ network) by which a mobile device connects to the Internet. In some cases, such local area networks in oil and gas bearing regions may provide wireless access to a native mobile application executing on smart phones by which fluid transport trucks are dispatched, such as the application described in U.S. Provisional Patent Application 62/095,640, filed 22 Dec. 2014, the entire contents of which are hereby incorporated by reference for all purposes. In some embodiments, the nodes may convey images from and instructions to the mobile surveillance units described in U.S. Provisional Patent Application 62/060,068, filed 6 Oct. 2014, the entire contents of which are hereby incorporated by reference for all purposes.

In some cases, each of the nodes 12-20 may be geographically remote from one another, for example, more than 100 meters from one another, and in some places, more than 1 kilometer from one another, for example, in rural deployments. Such wireless interfaces may serve to transmit data on the network 10 from a host computing device and to receive data transmitted to the host computing device on the network 10. In some cases, the interfaces may buffer the data in memory of the interface (e.g., outside the host's address space), and drivers executed by the host may transition the data between the memory space of the host device (e.g., random access memory addressable connected directly to a CPU of the host via a memory bus) and the memory of the wireless interface. The wireless interfaces may further serve to relay data from one node to another, for example, without that data generating interrupts in the host device or entering the address space of the host device, for instance, when being relayed between intermediary hops in a route.

In some cases, some of the nodes may be mobile, for example, a node conveyed in a vehicle, like a truck conveying fluid to or from oil wells, such as wastewater or oil. In another example, the nodes may be mobile and associated with technicians in the field, for instance, truck drivers in need of dispatch moving between oil wells or salt water disposal facilities. In some embodiments, nodes may be wireless modems, for example, associated with laptop computer serving as host devices.

In some embodiments, the nodes may each be associated with a portable battery supply, a wall outlet in a residence, or some nodes may share power with on-site industrial equipment. For example, some nodes may share power supply with a site master controller, like that described in U.S. Pat. No. 8,649,909. Leveraging existing, often relatively expensive, distributed rural deployments of power in oil and gas fields is expected to provide relatively low marginal cost power to the nodes in such applications relative to systems that use power supplies constructed for the sole purpose of operating a wireless network. That said, some or all of the nodes may have power supplies dedicated solely to operation of the network 10.

In some embodiments, as noted above, some of the nodes may serve as gateway node to the Internet. For example, some nodes serving as gateway nodes may have a wired connection to the Internet, for instance through a wired network interface, like an Ethernet network interface connected to a cable modem. In another example, some of the gateway nodes may include cellular radios and providing a cellular network interface. Such gateway nodes may operate at an end of routes through the wireless network 10, transitioning data between the wireless network 10 and the Internet.

Other nodes may serve as terminal nodes in routes, for example, a site master controller or (i.e., and/or) mobile surveillance unit receiving instructions from a remote server or sending monitoring data to the remote server. In another example, terminal nodes may include a technician operating a laptop and using Internet access provided via the network 10. In some cases, data may be sent in two directions along the illustrated route, for instance, conveying requests and responses and acknowledgment signals. In some cases, the conveyed data may be packetized, for example, using packets defined by a version of the Internet Protocol or the Ethernet protocol.

Figure 2:
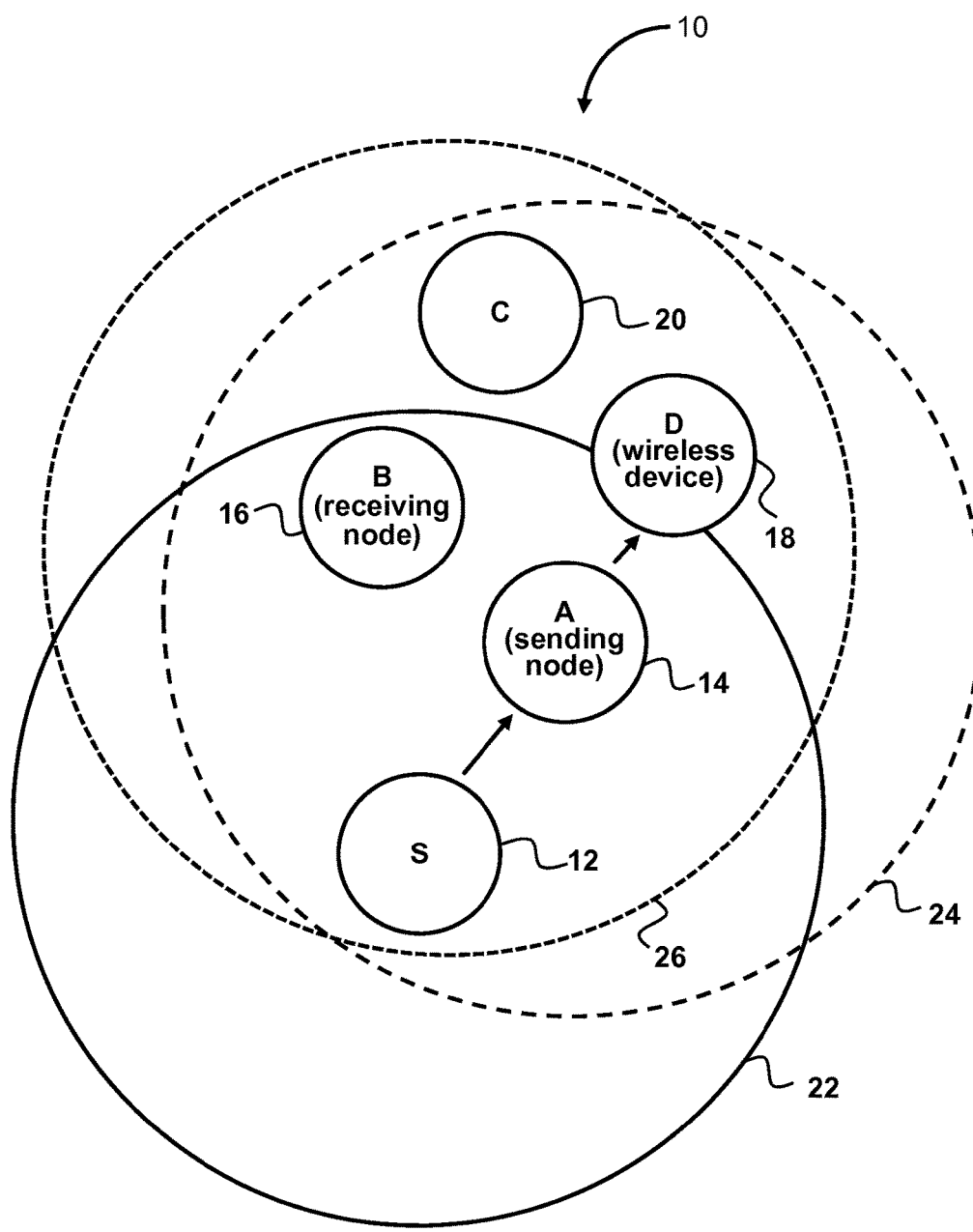

Each of the nodes 12-20 may have a broadcast range, which is illustrated in FIGS. 1 and 2 with circles 22, 24, and 26 for nodes 12, 14, and 16, respectively. Routes may be selected such that each hop along the route, for instance, the hop from node 12 to 14, the hop from node 14 to 16, and the hop from node 16 to 18, may leave nodes on either end of the hop within the broadcast range of nodes on either side of the hop.

In the illustrated example of FIG. 1, the route may have been selected when the nodes were geographically differently arranged. For example, node 18 may have moved closer to node a subsequent to route selection. As a result, node 18 is now within broadcast range of node 14, and the illustrated route includes unnecessary, wasteful hops, including node 16 that consume valuable bandwidth within the broadcast medium.

To recapture this bandwidth, some embodiments may execute a process described below with reference to FIGS. 3 through 5 to shorten the illustrated route in an ad hoc fashion. Ad hoc route selection is expected to facilitate use cases in rural areas, where communication with a central node is unreliable. As shown by FIG. 2, after executing these processes, the route has been shortened by one hop, excluding node 16. Reducing the hops, frees bandwidth on the medium for use by nodes in range, for instance, to construct other routes through the network 10 to serve communications with other terminal nodes.

Figure 3:
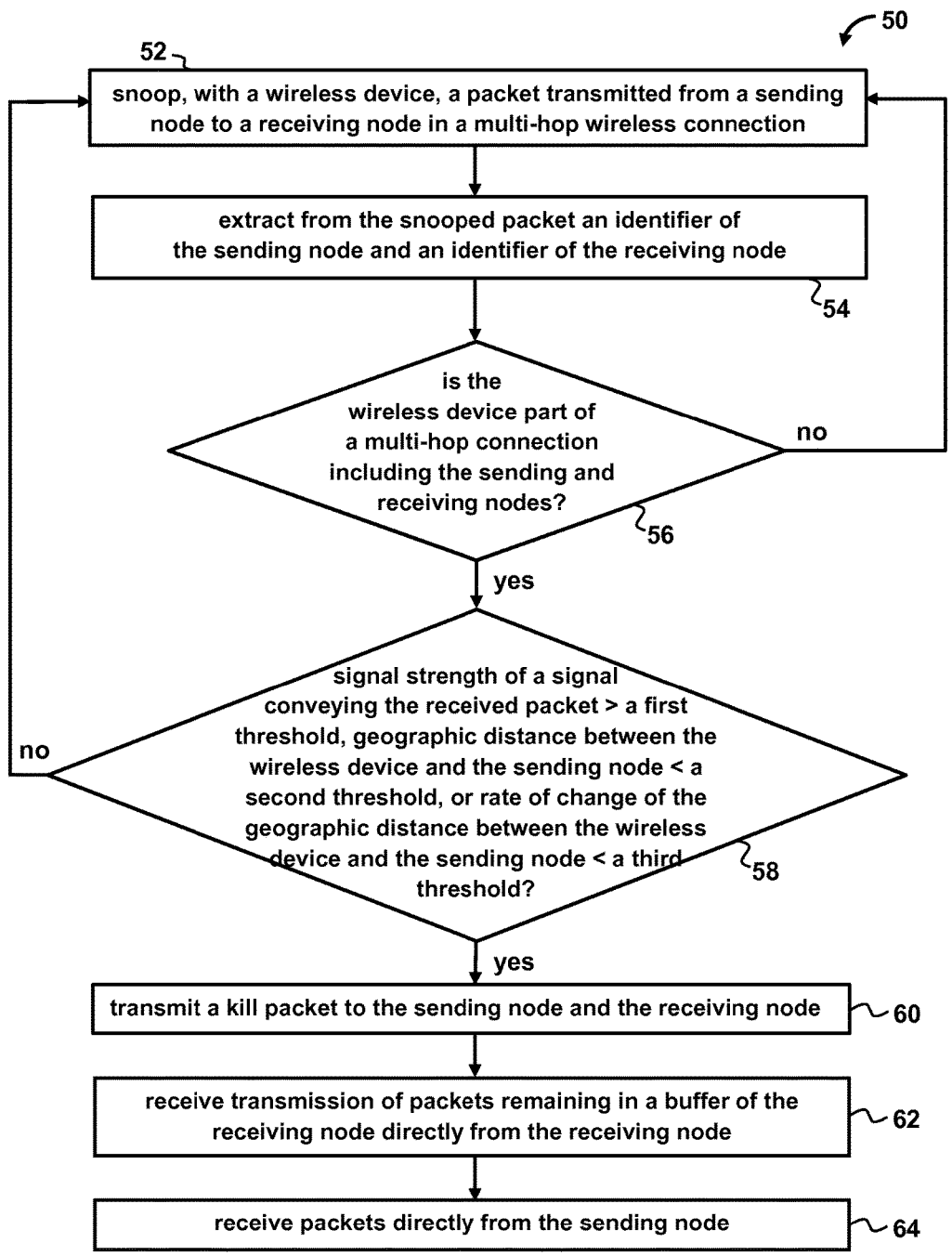
FIG. 3 is a flow chart showing a process to determine that a route is to be adjusted.

FIG. 3 illustrates an example of a process 50 that may be performed by node 18 in FIG. 1 to initiate a process of shortening an existing route through a multi-hop wireless connection (in the example of FIG. 1, the connection including hops from nodes 12 to 14, 14 to 16, and 16 to 18). In some cases, instructions to perform the steps of process 50, and the other processes described herein, may be stored in a tangible, non-transitory, machine-readable memory (such as in the form of firmware flashed to flash memory of a wireless interface) as computer instructions, and those instructions, when executed by a processor (such as a microprocessor of a wireless interface, which may be different from a CPU of a host system) may cause the processor to effectuate the described steps.

Process 50 may begin with snooping, with the wireless device, a packet transmitted from a sending node to a receiving node in a multi-hop wireless connection, as illustrated by block 52. Snooping may include node 18 receiving a signal broadcast by node 14 to effectuate the hop between nodes 14 and 16. Such broadcasts may include an identifier, such as a medium access control (MAC) address, of the sending node and the receiving node along with information to distinguish the route from other routes having hops between these nodes. Node 18, in this example, is not the node to which the broadcast is addressed, at least at the data link layer of the open systems interconnect (OSI) model, even if node 18 is the node to which the overall route is directed at the network layer of the OSI model. Accordingly, in the present context, node 18 is said to have "snooped" this signal intended for node 16, and snooping is possible because node 18 has moved into the broadcast range of node 14, in this example.

The snooped packet, and the other packets herein (e.g., kill packets), should not be understood as limited to a single sequence of data. In some cases, the packets may be conveyed over multiple transmissions and may be broken up into multiple packets defined by a lower layer or higher layer of the OSI model. Similarly, packets described as having various purposes, such as the below described, kill packets, should not be understood is limited to packets that serve solely that functionality, as such packets may contain additional instructions or other information. Further, in some embodiments, wireless devices may include filters that disregard signals address to other wireless devices. To facilitate snooping, some embodiments may bypass these filters by operating the wireless device in promiscuous mode, by which signals are received and processed, e.g., at least by firmware, and in some cases by drivers or applications executing in a operating system of the host, without regard to whether they are addressed to the wireless device.

In some embodiments, the wireless device, such as node 18, may extract from the snooped packet an identifier of the sending node and an identifier of the receiving node, as indicated by block 54. In the above example, the identifier of the sending node may include a MAC address of the node 14, and the identifier of the receiving node may include a MAC address of the node 16, both along with information to distinguish the route at issue. In some cases, these addresses may be encoded in a header of the packet, such as a header that precedes a payload of the packet having data carried across the multiple hops.

In some embodiments, identifiers of nodes along a route may include time information. For example, when constructing a route, each node in the route may capture a timestamp, for instance, corresponding to a time at which that node determined to participate in the route. In some cases, this timestamp may be conveyed to each node along the route, and those nodes may store that timestamp in memory, for example, in a routing table identifying each node along a given route in which the notice participating. In some cases, these timestamps may be encoded in the headers by which packets are transmitted, and the timestamps for the sender and the receiver nodes may be parsed from the header upon snooping of the packet. In some embodiments, a collection of each timestamp along a route may be used to calculate a unique route identifier, such as by calculating a hash value, e.g. an MD5 hash value, on the sequence of each of the timestamps and MAC addresses. In some embodiments, the route identifier may be encoded in the header of the snooped packet and parsed from the snooped packet. In some embodiments, the nodes may include satellite navigation signal sensors, such as GPS modules, or other location modules operable to determine the wireless device's location. In some cases, those locations may be stored in memory of the wireless device, for example, in a configuration file for a wireless device at a fixed location. In some embodiments, these locations may be encoded in a header of the packet, and that location may be parsed by the wireless device.

Next, some embodiments may determine whether the wireless device that snooped the packet is part of a multi-hop connection including the sending and the receiving nodes, as indicated by block 56. Some embodiments may compare the extracted information to records in a routing table in memory of the wireless device and, upon detecting a match, determine that the wireless device is part of a multi-hop connection including the sending and receiving nodes. For example, some embodiments may determine whether timestamps associated with the sending node and the receiving node corresponding to records of timestamps in the routing table defining the illustrated route of FIG. 1. (In some applications where multiple routes are operating concurrently in the network, reliance on MAC addresses alone may not be sufficient to distinguish routes, as, for example, nodes 14 and 16 may also form a hop through another route that does not include node 18.) In another example, a unique route identifier parsed from the snooped packet may be compared to a list of unique route identifiers in a routing table of the wireless device, such as a routing table of a wireless interface of a computing device. Matched route identifiers may indicate that the wireless device is part of a multi-hop connection including the sending and receiving nodes. Upon determining that the wireless device is not part of the wireless connection, e.g., that a match is not found, some embodiments may return to step 52. Upon determining that the wireless device is part of a multi-hop connection including the sending and receiving nodes, e.g., that a match is found in the routing table, some embodiments may proceed to step 58.

Some embodiments may determine whether a signal strength of the snooped packet is greater than a threshold signal strength, as indicated by block 58. When snooping the packet in step 52, some embodiments may measure a signal strength of the signal broadcast by, for example, node 14 to node 16 as perceived by node 18. In some cases, the signal strength may be too low to be reliable, and some embodiments may return to step 52 upon determining that the signal strength is not greater than a threshold. In some cases, the determination of step 58 may include determining whether the signal-to-noise ratio (e.g., a SINR) exceeds a threshold to account for relatively noisy wireless environments, with similar decision outputs as those illustrated in response to the signal-to-noise determination.

In some embodiments, the threshold may be a fixed value, or some embodiments may adjust the threshold dynamically. In some embodiments, the threshold may be based on a permitted broadcast strength obtained from a whitespace wireless spectrum database that is remotely hosted. In some embodiments, the threshold may be dynamically adjusted based on a packet loss rate measured by the wireless device, for instance, by rate at which packets are retransmitted.

In some embodiments, the determination of step 58 may include (e.g., be replaced by, preceded by, or be followed by) a determination of geographic distance between the wireless device and the sending node. In some embodiments, the location of the sending node may be parsed from a header of the snooped packet, and that location may be compared to a location of the wireless device, for example, obtained with the techniques described above. In some embodiments, if (e.g., if and only if) the geographic distance is greater than a threshold, some embodiments may return to step 52, or if the geographic distance is not greater than the threshold, some embodiments may proceed to step 60. Some embodiments may compare a rate of change of this geographic distance to a threshold, for example, by calculating an expected link life and comparing the link life to a threshold duration. For example, if one node is moving away from the other at a high rate, even if the geographic distance is relatively close, the rate of change may exceed a threshold, indicating that a relatively low link life would result, and adjusting the routing table based on the snooped signal may yield a relatively inefficient reconfiguration.

Upon determining that the signal strength of the packet is greater than the threshold, some embodiments may proceed to step 60.

In step 60, some embodiments may transmit a kill packet to the sending node and to the receiving node. In some cases, the kill packet may be one or more transmissions that instruct each of these nodes to adjust their routing tables, and these nodes may perform the processes described below with reference to FIGS. 4 and 5. Some embodiments may further adjust a routing table of the wireless device to reflect adjustment of the route, for example, by designating the identifier of the receiving node as no longer belonging to the route, for instance, by deleting the identifier.

Next, some embodiments may receive transmission of packets remaining in a buffer of the receiving node directly from the receiving node, as indicated by block 62. In some embodiments, the intermediate nodes along a route may maintain a last-in-first-out buffer that stores received packets until those packets are retransmitted to another upstream node along a route and that upstream node acknowledges receipt of the packet. Some embodiments may flush the buffer of the receiving node prior to removing the receiving node from the route.

Next, some embodiments may receive packets directly from the sending node, as indicated by block 64, for example, packets sent along a revised multi-hop wireless connection. In some embodiments, the multi-hop wireless connection may be reconfigured to remove the former receiving node and may continue in operation as packets are exchanged along the multi-hop connection, for instance, in the change reflected between FIGS. 1 and 2, bypassing the node 16.

Figure 4:
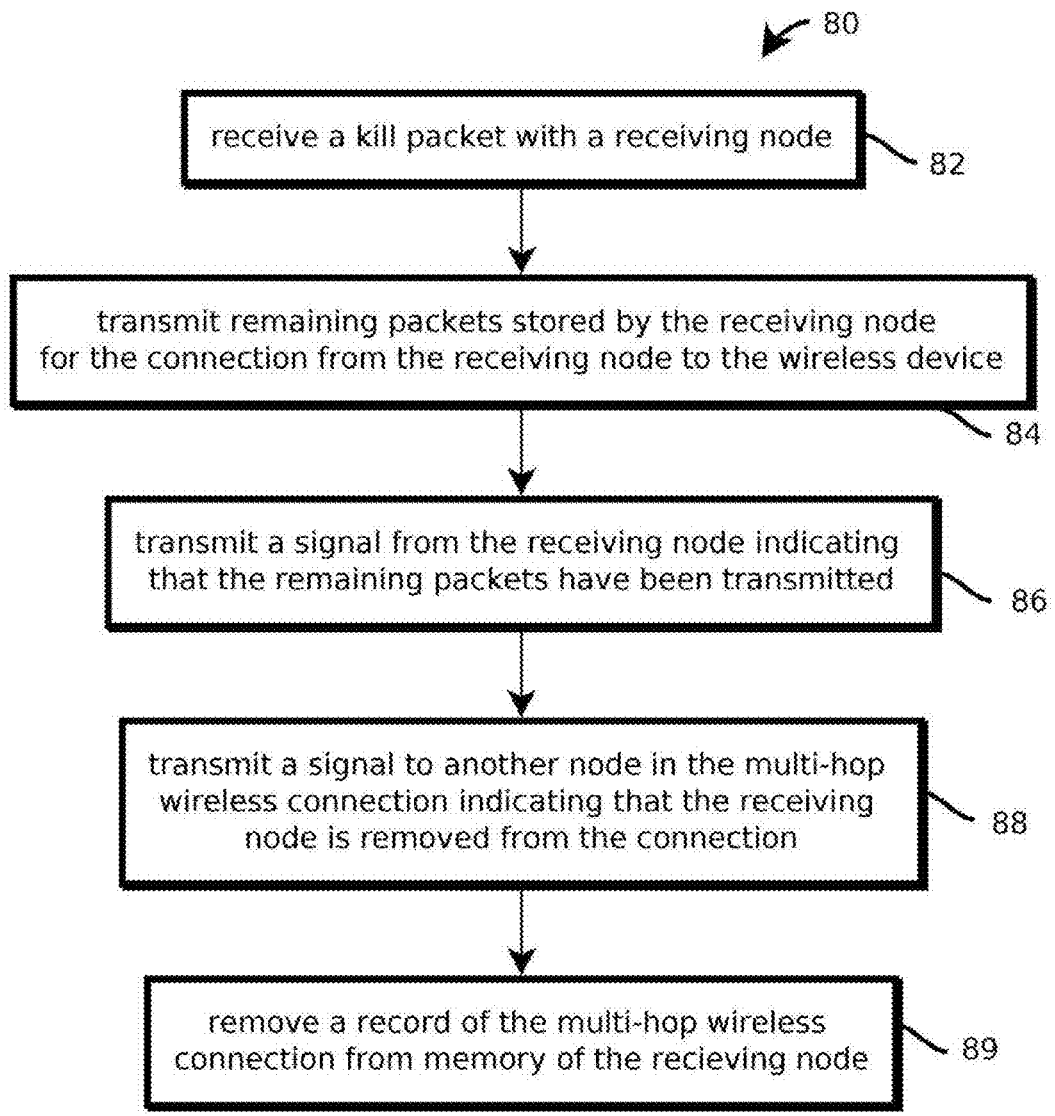
FIG. 4 is a flow chart showing a process executed by a node on an existing route to adjust the route to exclude the node.

FIG. 4 illustrates an example of a process 80 executed by a node being removed from a route. By way of example, the process 80 may be executed by wireless interface for node 16 in the example of FIGS. 1 and 2.

In some embodiments, the process 80 includes receiving a kill packet with the receiving node, as indicated by block 82. In some cases, the kill packet may be sent during execution of the process 50 of FIG. 3. In some embodiments, the kill packet may be received from another node in a wireless route including the receiving node. The term receiving node should be understood in this context to refer to the node receiving a packet that was snooped by a node performing the process of FIG. 3. Further, it should be understood that the receiving node and sending node are not necessarily the nodes at ends of a route, e.g., the gateway and terminal nodes, as intermediate nodes may serve as sending and receiving nodes in this context.

Upon receiving the kill packet, some embodiments may transmit remaining packets stored by the receiving node for the connection from the receiving node to the wireless device from which the kill packet was received, as indicated by block 84. Some embodiments may retrieve these packets from a buffer of the receiving nodes and transmit those packets to the wireless device. In some embodiments, the receiving node may participate in multiple routes, and the buffer (e.g., in dedicated memory of the wireless interface, like on a printed circuit board with a microprocessor of the wireless interface, separate from a system board of the host, or in the host's address space, like in DRAM on a system board of the host device) may store packets for each of the routes. In these use cases, some embodiments may extract from the buffer only those packets pertaining to a route identified by the kill packet.

Next, some embodiments may transmit a signal from the receiving node indicating that the remaining packets have been transmitted, as indicated by block 86, and then transmit a signal to another node in the multi-hop wireless connection indicating that the receiving node is removed from the connection, as indicated by block 88. In some embodiments, the signal may be repeated along the length of the route, and each node along the route may update a respective routing table stored by that node to reflect removal of the receiving node from the route. Finally, the receiving node may remove a record of the multi-hop wireless connection from memory of the receiving node, as indicated by block 90, for example, by deleting a corresponding record from a routing table of the receiving node.

Figure 5:
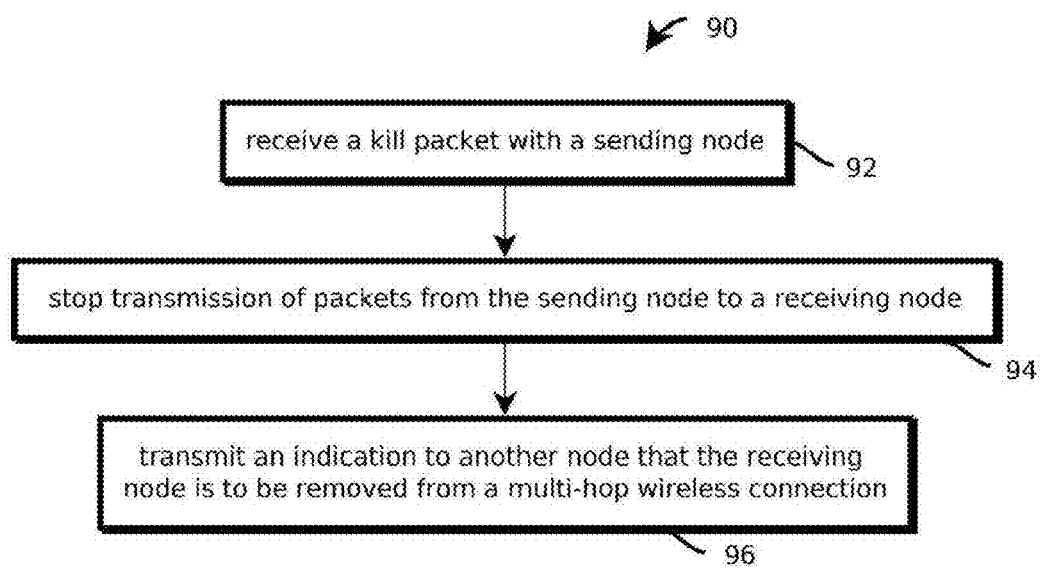
FIG. 5 is a flow chart showing a process executed by a node on a route to exclude another node from the route.

FIG. 5 shows an example of a process 90 to update the route that may be performed by the node 14 in the example of FIGS. 1 and 2. In this example, the node 14 may receive a kill packet with the sending node, as indicated by block 92. In this example, the sending node should be understood to refer to a sending node for transmission that was snooped by the node sending the kill packet. In some cases, the kill packet may identify a route along which the snooped packet was transmitted. Next, some embodiments may stop transmission of packets from the sending node to a receiving node, as indicated by block 94. This may include updating a routing table of the sending node to indicate that the receiving node is no longer a part of the route. Next, some embodiments may transmit an indication to another node that the receiving node is to be removed from a multi-hop wireless connection, as indicated by block 96. This step may be repeated by each node along a route to remove the receiving node from the route and reconfigure the route to be shorter.

Figure 6:
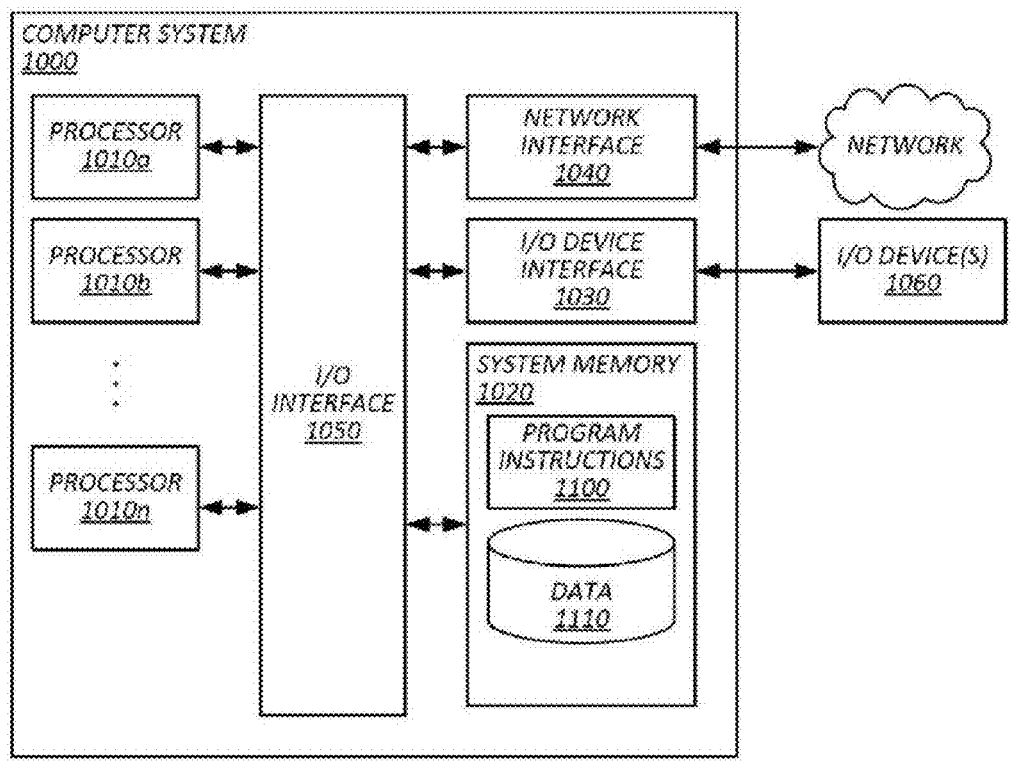
FIG. 6 is a block diagram of a computer system that many include a network interface using the techniques described herein.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:

1. A method of operating a wireless device configured to act as a node in an ad hoc multi-hop mobile network, the method comprising: snooping, with a wireless device, a packet transmitted from a sending node to a receiving node in a multi-hop wireless connection, the sending node and the receiving node being in a different location from the wireless device; extracting from the snooped packet an identifier of the sending node and an identifier of the receiving node; determining based on the identifier of the sending node, the identifier of the receiving node, and a record in memory of the wireless device that the wireless device is part of a multi-hop wireless connection including the sending node and the receiving node; determining that a signal strength of a signal conveying the snooped packet exceeds a threshold; and transmitting a kill packet to the sending node and the receiving node that reconfigures the multi-hop wireless connection to bypass the receiving node.
2. The method of embodiment 1, wherein the receiving node is upstream from the wireless device in the multi-hop wireless connection, and wherein transmitting the kill packet shortens the multi-hop connection by removing the receiving node from the multi-hop route of the connection.
3. The method of any of embodiments 1-2, wherein the snooped packet includes a timestamp generated by the sending node, and wherein the timestamp corresponds to the identifier of the sending node.
4. The method of embodiment 3, wherein the snooped packet includes a timestamp generated by the receiving node.
5. The method of embodiment 3, wherein determining based on the identifier of the sending node, the identifier of the receiving node, and a record in memory of the wireless device that the wireless device is part of a multi-hop wireless connection including the sending node and the receiving node comprises: determining that the timestamp is identified in a route table of the wireless device.
6. The method of any of embodiments 1-5, wherein snooping, with a wireless device, a packet transmitted from a sending node to a receiving node in a multi-hop wireless connection comprises: receiving the packet in a promiscuous mode of operation in which substantially all received packets are analyzed regardless of whether the packet is directly addressed to the wireless device.
7. The method of any of embodiments 1-6, wherein the wireless device comprises a geolocation sensor, and comprising: determining to transmit the kill packet based on the a location from the geolocation sensor.
8. The method of embodiment 7, wherein determining to transmit the kill packet based on the a location from the geolocation sensor comprises: determining a distance between the location and a location of the receiving node; and determining to transmit the kill packet based on the difference.
9. The method of any of embodiments 1-8, wherein the identifier of the sending node is associated with a geolocation of the sending node obtained from the sending node.
10. The method of any of embodiments 1-9, comprising: after transmitting the kill packet, receiving transmission of packets remaining in a buffer of the receiving node directly from the receiving node; after receiving the packets in the buffer of the receiving node, receiving packets directly from the sending node.
11. The method of embodiment 10, comprising: receiving a node-unloaded signal from the receiving node indicating that the receiving node has transmitted the packets in the buffer; and in response to receiving the node-unloaded signal, removing the receiving node from a description of the multi-hop route in memory of the wireless device.
12. The method of embodiment 11, wherein each node in the multi-hop wireless connection is identified in memory of the wireless device.
13. The method of any of embodiments 1-12, comprising: receiving the kill packet with the receiving node; transmitting remaining packets stored by the receiving node for the connection from the receiving node to the wireless device; transmitting a signal from the receiving node indicating that the remaining packets have been transmitted; transmitting a signal to another node in the multi-hop wireless connection indicating that the receiving node is removed from the connection; and removing a record of the multi-hop wireless connection from memory of the receiving node.
14. The method of any of embodiments 1-13, comprising: receiving the kill packet with the sending node; stopping transmission of packets from the sending node to the receiving node; and transmitting an indication to another node that the receiving node is to be removed from the connection.
15. The method of any of embodiments 1-14, wherein the kill packet is propagated in both directions of the multi-hop wireless connection from the receiving node to each node in the connection.
16. The method of any of embodiments 1-15, wherein the wireless device shares a power supply with an oil or gas well or saltwater disposal facility.
17. The method of any of embodiments 1-16, wherein the sending node, the receiving node, or the wireless device is coupled to well control or monitoring equipment, the method further comprises injecting a fluid into, or extracting a fluid from, a well controlled or monitored by the equipment.
18. The method of any of embodiments 1-17, wherein the multi-hop wireless connection is coupled to the Internet, and wherein the snooped packet is transmitted with orthogonal frequency-division multiple access.
19. A tangible, non-transitory, machine-readable medium storing instructions that when executed by a data processing apparatus cause the data processing apparatus to perform operations comprising: the method of any of embodiments 1-18
20. A wireless interface, comprising:
one or more processors; and
memory storing instructions that when executed by the processors cause the processors to effectuate operations comprising: the method of any of embodiments 1-18.

What is claimed is:
1. A method of operating a wireless device configured to act as a node in an ad hoc network, the method comprising:

receiving, with a wireless device, a packet transmitted from a sending node to a receiving node in a multi-hop wireless connection, the sending node and the receiving node being in a different location from the wireless device, wherein the multi-hop wireless connection specifies a route through an ad hoc network, and wherein the route comprises at least three transmitting nodes;

identifying an identifier of the sending node and an identifier of the receiving node within contents of the received packet;

determining based on the identifier of the sending node, the identifier of the receiving node, and a record in a memory of the wireless device that the wireless device is in the route of the multi-hop wireless connection including the sending and receiving nodes;

determining that one or more of a signal strength of a signal conveying the received packet is above a first threshold, a geographic distance between the wireless device and the sending node is beneath a second threshold, or a rate of change of the geographic distance between the wireless device and the sending node is beneath a third threshold; and in response to the determination that one or more of the signal strength of the signal conveying the received packet is above the first threshold, the geographic distance between the wireless device and the sending node is beneath the second threshold, or the rate of change of the geographic distance between the wireless device and the sending node is beneath the third threshold, wirelessly transmitting a kill packet to the sending node and the receiving node that reconfigures the multi-hop wireless connection to specify a different route through the ad hoc network that bypasses the receiving node.

2. The method of claim 1, wherein one or more of the first, second, or third thresholds is adjusted based on a packet loss amount determined by the wireless device.

3. The method of claim 2, wherein the determination of the packet loss amount is a determination of a packet loss rate based on a rate at which packets are retransmitted by the sending node.

4. The method of claim 1, wherein one or more of the sending node, the receiving node, or the wireless device comprises a gateway to Internet or a link to a cellular network.

5. The method of claim 1, wherein the sending node, the receiving node, and the wireless device are mobile devices, each mobile device being operated in part by at least one user.

6. The method of claim 1, wherein at least some nodes of the ad hoc network are each communicatively coupled with actuators or sensors of oil or gas related equipment in an oil-or-gas field.

7. The method of claim 1, further comprising:
identifying time information of the sending node and time information of the receiving node within contents of the received packet.

8. The method of claim 7, wherein the determination that the wireless device is part of the route is further based on the time information of either the sending or receiving node corresponding to the record.

9. The method of claim 1, further comprising:
identifying a unique route identifier within contents of the received packet.

10. The method of claim 9, wherein the determination that the wireless device is part of the route is further based on the unique route identifier corresponding to the record.

11. The method of claim 1, further comprising:
retrieving remaining packets that pertain to the route from a memory of the receiving node; and
receiving subsequent packets directly from the sending node.

12. The method of claim 1, wherein the reconfiguration of the multi-hop wireless connection includes addition of the wireless device to the different route.

13. The method of claim 1, wherein edges of transmission range between the sending node and the receiving node overlap with edges of transmission range between the sending node and the wireless device.

14. The method of claim 4, wherein the wireless device queries a remote database via the Internet with its current geographic location and selects among responsive unclaimed spectrum before transmitting the kill packet.

15. The method of claim 1, wherein the reconfiguration of the multi-hop wireless connection specifying the different route is performed without re-creating an entire route.

16. A non-transitory, machine-readable media storing instructions that when executed by one or more processors effectuate operations comprising:

receiving, with a wireless system, a packet transmitted from a sending node to a receiving node in a multi-hop wireless connection, the sending node and the receiving node being in a different location from the wireless system, wherein the multi-hop wireless connection specifies a route through an ad hoc network, and wherein the route comprises at least three transmitting nodes;

identifying an identifier of the sending node and an identifier of the receiving node within contents of the received packet;

determining based on the identifier of the sending node, the identifier of the receiving node, and a record in a memory of the wireless system that the wireless system is in the route of the multi-hop wireless connection including the sending and receiving nodes;

determining that one or more of a signal to noise ratio of a signal conveying the received packet is above a first threshold, a geographic distance between the wireless system and the sending node is beneath a second threshold, or a rate of change of the geographic distance between the wireless system and the sending node is beneath a third threshold; and wirelessly transmitting a kill packet to the sending node and the receiving node that reconfigures the multi-hop wireless connection to specify a different route through the ad hoc network that bypasses the receiving node.

17. The non-transitory, machine-readable media of claim 16, wherein one or more of the first, second, or third thresholds is adjusted based on a packet loss amount determined by the wireless device.

18. The non-transitory, machine-readable media of claim 17, wherein the determination of the packet loss amount is a determination of a packet loss rate based on a rate at which packets are retransmitted by the sending node.

19. The non-transitory, machine-readable media of claim 16, wherein one or more of the sending node, the receiving node, or the wireless device comprises a gateway to Internet or a link to a cellular network.

20. The non-transitory, machine-readable media of claim 16, wherein the sending node, the receiving node, and the wireless device are mobile devices, each mobile device being operated in part by at least one user.

21. The non-transitory, machine-readable media of claim 16, wherein at least some nodes of the ad hoc network are each communicatively coupled with actuators or sensors of oil or gas related equipment in an oil-or-gas field.

22. The non-transitory, machine-readable media of claim 16, further comprising:
identifying time information of the sending node and time information of the receiving node within contents of the received packet.

23. The non-transitory, machine-readable media of claim 22, wherein the determination that the wireless device is part of the route is further based on the time information of either the sending or receiving node corresponding to the record.

24. The non-transitory, machine-readable media of claim 16, further comprising:
identifying a unique route identifier within contents of the received packet.

25. The non-transitory, machine-readable media of claim 24, wherein the determination that the wireless device is part of the route is further based on the unique route identifier corresponding to the record.

26. The non-transitory, machine-readable media of claim 16, further comprising:
retrieving remaining packets that pertain to the route from a memory of the receiving node; and
receiving subsequent packets directly from the sending node.

27. The non-transitory, machine-readable media of claim 16, wherein the reconfiguration of the multi-hop wireless connection includes addition of the wireless device to the different route.

28. The non-transitory, machine-readable media of claim 16, wherein edges of transmission range between the sending node and the receiving node overlap with edges of transmission range between the sending node and the wireless device.

29. The non-transitory, machine-readable media of claim 19, wherein the wireless device queries a remote database via the Internet with its current geographic location and selects among responsive unclaimed spectrum before transmitting the kill packet.

30. The non-transitory, machine-readable media of claim 16, wherein the reconfiguration of the multi-hop wireless connection specifying the different route is performed without re-creating an entire route.

31. A method of operating a wireless device configured to act as a node in an ad hoc network, the method comprising:
receiving, with a wireless device, a packet transmitted from a sending node to a receiving node in a multi-hop wireless connection, the sending node and the receiving node being in a different location from the wireless device, wherein the multi-hop wireless connection specifies a route through an ad hoc network, and wherein the route comprises at least three transmitting nodes;
identifying an identifier of the sending node and an identifier of the receiving node within contents of the received packet;
determining based on the identifier of the sending node, the identifier of the receiving node, and a record in a memory of the wireless device that the wireless device is in the route of the multi-hop wireless connection including the sending and receiving nodes;
determining that one or more of a signal to noise ratio of a signal conveying the received packet is above a first threshold, a geographic distance between the wireless device and the sending node is beneath a second threshold, or a rate of change of the geographic distance between the wireless device and the sending node is beneath a third threshold; and
in response to the determination that one or more of the signal to noise ratio of the signal conveying the received packet is above the first threshold, the geographic distance between the wireless device and the sending node is beneath the second threshold, or the rate of change of the geographic distance between the wireless device and the sending node is beneath the third threshold, wirelessly transmitting a kill packet to the sending node and the receiving node that reconfigures the multi-hop wireless connection to specify a different route through the ad hoc network that bypasses the receiving node.

32. A non-transitory, machine-readable media storing instructions that when executed by one or more processors effectuate operations comprising:
receiving, with a wireless system, a packet transmitted from a sending node to a receiving node in a multi-hop wireless connection, the sending node and the receiving node being in a different location from the wireless system, wherein the multi-hop wireless connection specifies a route through an ad hoc network, and wherein the route comprises at least three transmitting nodes;
identifying an identifier of the sending node and an identifier of the receiving node within contents of the received packet;
determining based on the identifier of the sending node, the identifier of the receiving node, and a record in a memory of the wireless system that the wireless system is in the route of the multi-hop wireless connection including the sending and receiving nodes;
determining that one or more of a signal strength of a signal conveying the received packet is above a first threshold, a geographic distance between the wireless system and the sending node is beneath a second threshold, or a rate of change of the geographic distance between the wireless system and the sending node is beneath a third threshold; and
wirelessly transmitting a kill packet to the sending node and the receiving node that reconfigures the multi-hop wireless connection to specify a different route through the ad hoc network that bypasses the receiving node.

* * * * *